3,232,917
OXIDATION OF CRYSTALLINE POLY-α-OLEFINS
Marvin A. McCall and Newton H. Shearer, Jr., Kingsport, Tenn., assignors to Eastman Kodak Company, Rochester, N.Y., a corporation of New Jersey
No Drawing. Filed Mar. 7, 1960, Ser. No. 12,944
9 Claims. (Cl. 260—93.7)

This invention relates to a novel, convenient and commercially feasible process for preparing oxidation products of poly-α-olefins. In a specific aspect, this invention relates to the oxidation of poly-α-olefins in solid particulate form. In a more specific aspect, this invention relates to the oxidation of crystalline polypropylene in solid particulate form.

It is known in the art that crystalline poly-α-olefins, for example, polypropylene, can be oxidized to produce a variety of useful products. However, the methods in the prior art generally involve oxidation of the poly-α-olefin in the form of a melt or in solution in a suitable organic solvent. For example, according to U.S. Patent 2,828,296 issued March 25, 1958, wherein a method for oxidizing crystalline polypropylene waxes to form useful emulsifiable wax products is disclosed, it is stated (column 2, lines 65 et seq.) that it is necessary to have the wax in liquid form during the course of the oxidation.

It is also known, that the oxidation of polymer melts present many problems which involve the viscosity of the melt and the difficulty in obtaining an effective contact between the oxidizing agent, i.e., air or oxygen, and the melt. Dispersion of air or oxygen in a viscous melt is very difficult and the rate of oxidation becomes a direct function of this dispersion. This difficulty accounts for the slowness of the oxidation procedures involving melts. The same troubles of dispersion of a gas in a liquid are found in the oxidation of solutions of poly-α-olefins, however, to a lesser degree since the solution is less viscous than a melt. Furthermore, a method of oxidizing a poly-α-olefin solution presents the added disadvantage and expense of having to isolate the oxidized polymer from solution resulting in the necessary loss or recovery of solvent. Until the present invention, no process had been developed which avoided these disadvantages.

It is also well known that substantially crystalline high molecular weight polypropylene can be spun into synthetic fibers having unusual physical properties. This polymer is, however, subject to inherent disabilities which greatly restrict its utility in the fabrication of general fibers. For example, high molecular weight fiber-forming crystalline polypropylene is a relatively insoluble, chemically inert hydrophobic material. Since it is not readily premeable to water, it cannot be dyed satisfactorily by the ordinary dyeing procedures. Since it is relatively inert chemically, it cannot be permanently dyed even with hydrocarbon soluble dyestuffs. Hence, it is most desirable to obtain fibers having increased dyeability in order to increase their value in the textile field.

Furthermore, a serious defect of crystalline polypropylene polymers which must be overcome to increase their utility in the fiber, film and molding fields, is the difficulty of printing upon sheets, films, or other objects prepared from them. In order to achieve its maximum usage in these fields, a polymer should adapt itself readily to printing.

Oxidation of high molecular weight crystalline polypropylene according to the process in this invention imparts improved dyeability and printability when the oxidized polypropylene powder is converted into fiber, film or molded objects.

Accordingly, it is an object of this invention to provide a new and improved method of oxidizing crystalline poly-α-olefins which avoids the necessity of employing a polymer melt or solution.

Another object of this invention is to provide a new and improved method for the oxidation of poly-α-olefins, in particulate form, with oxygen or air.

Another object of this invention is to provide a new and improved method of oxidation of polypropylene wax to give waxes which are readily emulsifiable in water solutions.

Another object of the invention is to provide a new and improved method of oxidation of high molecular weight crystalline polypropylene to give improved dyeability and printability.

Still another object of the invention is to provide a very convenient, commercially feasible process for preparing emulsifiable high melting synthetic waxes from polypropylene as well as from other high melting crystalline poly-α-olefins and in particular to provide a process whereby the characteristics of the wax product can be varied over a considerable range.

Further objects of the invention will become apparent throughout the following description.

In accordance with this invention, and contrary to the teachings of the prior art, as exemplified by U.S. Patent 2,828,296, referred to above, we have found that crystalline poly-α-olefins containing 3 to 7 carbon atoms, and particularly polypropylene, can be oxidized much more effectively if the oxidation is carried out on the dry powdered poly-α-olefin rather than on the melt or solution, at a temperature below the melting point of the polymer being oxidized.

Our discovery that a powdered poly-α-olefin containing 3 to 7 carbon atoms can be oxidized as a dry powder without melting or dissolving presents many obvious advantages. One very decided advantage, from a commercial point of view, is that our oxidation method is faster than one involving the oxidation of a melt or solution of the same polymer, as shown in Example 9. Furthermore, our method does not require as high a temperature of operation as is used in a melt oxidation procedure. Moreover, our new process eliminates the use of a solvent medium for the oxidation and consequently, the need for recovery of the solvent. A further advantage is that crystalline polypropylene which is usually obtained as a finely divided powder from the polymerization reactor can be oxidized directly, without any preliminary melt or solution procedures being necessary.

A surprising feature of this invention is that our process, while very successful with crystalline poly-α-olefins containing 3 to 7 carbon atoms, for example, polypropylene, it is not successful with low density polyethylene as shown by Example 1.

The process of this invention can be carried out by simply exposing dry poly-α-olefins, in particulate form, to air or oxygen which can be diluted with nitrogen or other inert diluent, at a temperature below the melting point of the polymer. While temperature ranges of about 90 to about 180° C. are operable, it must be understood that temperatures above the melting or sintering point for a particular poly-α-olefin are to be avoided. Hence, a temperature range of about 90 to about 145° C. and more preferably about 100 to about 135° C. will be employed with polypropylene which melts at about 155° C., while higher temperatures are found to be more effective for other higher melting α-olefin polymers containing 3 to 7 carbon atoms. For example, for polymers such as crystalline poly-3-methyl-1-pentene, poly-4-methyl-1-butene, and poly-3-methyl-1-hexene, the temperatures employed will vary within the range of about 90 to about 180° C. with the preferred range being about 130 to about 160° C.

The crystalline poly-α-olefins which can be employed in the process of this invention are those containing 3 to 7 carbon atoms having a density of at least 0.90, and more preferably 0.90 to 0.925, a molecular weight of at least 1000, with molecular weights within the range of about 2000 to 1,000,000 being preferred. Accordingly, suitable poly-α-olefins include polypropylene, poly-4-methyl-1-pentene, poly-3-methyl-1-butene, poly-3-methyl-1-hexene and the like.

The higher molecular weight crystalline polypropylene which is usually obtained from the polymerization reactor as a fine powder may be used directly in the oxidation procedure of this invention. Polypropylene wax prepared by thermal degradation, for example, by the method disclosed in U.S. Patent 2,835,659, or higher molecular weight polypropylene that has been fused, may be powdered by dissolving it in a suitable hot solvent such as tetrachloroethylene, toluene, xylene and the like and precipitating the polymer by cooling the solvent while stirring or by adding a non-solvent such as acetone or alcohol to the hot solution of polypropylene while stirring vigorously.

The time of heating will vary widely from periods of several minutes to several hours depending upon such variable factors as the temperature employed within the range herein disclosed as well as the particle size of the polymer, the desired acid number of the product, which can be from about 2 to about 22, and similar variable factors. Consequently, the time of heating will depend upon the correlation of these several variable factors. Generally, the higher the temperature and the smaller the particle size, the faster the oxidation. In most cases, however, the oxidation is complete within one quarter to thirty hours, although longer or shorter periods can be employed.

A convenient laboratory method for carrying out the oxidation process of this invention is to place a finely powdered poly-α-olefin containing 3 to 7 carbon atoms, for example, polypropylene, in a circulating air oven. The powder may be spread out in a thin layer in the oven and stirred periodically to effectively expose the fine powder to the air. The oxidation may also be carried out by heating the poly-α-olefin powder with heat lamps, ultraviolet lamps and the like. In order to carry out the oxidation on a large scale the polymer is tumbled in a heated vessel containing air or oxygen. It is preferable to use air or oxygen diluted with nitrogen or some other inert gas at a concentration below the explosive limits. The oxidation may also be carried out continuously, by exposing the powder to air or oxygen in a fluid bed on conveyor type system.

The non-emulsifiable polypropylene waxes obtained according to the process of U.S. Patent 2,835,659, mentioned above, having an average molecular weight in the range of 1,000–8,000, a density of at least 0.90, a ball and ring softening point of at least 130° C., and an acid number of substantially zero are particularly adapted for use in our process. These waxes may be made emulsifiable by reacting them, in particulate form, with oxygen at a temperature below the melting point until the acid number of the product is in the desired range.

This invention can be further illustrated by the following examples of preferred embodiments thereof although it will be understood that these examples are included merely for purposes of illustration and are not intended to limit the scope of the invention unless otherwise specifically indicated.

*Example 1*

Low density polyethylene wax (100 g., density 0.923, I.V. 0.24) was powdered by dissolving in hot tetrachloroethylene then precipitated by adding ethyl alcohol to this vigorously stirred solution. The finely divided precipitate was filtered and dried. This polyethylene was prepared by high pressure polymerization, then degraded to a wax and oxidation was attempted in a circulating air oven at 90° C. Samples were taken periodically and the acid number determined on the sample. The results of this oxidation are tabulated below and should be compared with the results obtained with crystalline polypropylene wax as described in Example 2.

| Time in hours: | Acid number |
|---|---|
| 2 | 0 |
| 15 | 0 |
| 63 | 0.44 |
| 70.5 | 0.49 |

Note that even after 70.5 hr. the acid number was still less than 1.0 and this wax could not be emulsified. By comparison, crystalline polypropylene after 70.5 hr. under the same conditions of oxidation has an acid number of 15, or approximately 30 times that of the conventional low density polyethylene and is readily emulsified as shown by Example 2.

*Example 2*

A surprising feature of this invention is that our new process of oxidation is applicable to both low molecular weight polypropylene waxes and high molecular weight polypropylene polymers having an I.V. range from about 0.1 to about 4.0. Hence, polypropylene wax (500 g., I.V. 0.3) that had been prepared by thermal degradation was powdered by dissolving in hot tetrachloroethylene (2 lb.) then precipitated by adding ethyl alcohol to this vigorously stirred solution. The finely divided precipitate was filtered and dried. One hundred-gram aliquots of this finely divided powder were spread in a thin layer ¼ to ½-in. thick on a large tray and heated in an air circulating oven at 130° C. The material was stirred several times during the course of the run. Samples were taken periodically and the acid number determined on the sample. The results of this oxidation procedure are tabulated below.

| Time in hours: | Acid number |
|---|---|
| 2 | 3.8 |
| 3 | 7.6 |
| 4 | 10.7 |
| 5 | 15.1 |
| 6 | 17.4 |
| 21 | 27.3 |

A portion of the above material after oxidizing for 3 hr. (acid No. 10.7) was found to emulsify readily by several general emulsification procedures, one of which is given below.

EMULSIFICATION OF OXIDIZED POLYPROPYLENE

Oleic acid (7.0 g.) and oxidized polypropylene prepared by the above general procedure were melted together and then cooled to approximately 130° C. To this melted mixture was added 5 g. of 2-amino-2-methyl-1-propanol with good stirring. After the mixture became homogeneous is was poured into hot water (95° C.) with good stirring. The resulting emulsion could be used directly or it could be diluted with more water to make a more dilute wax emulsion. It can be used as a floor and furniture polish.

In a similar manner to that described above, crystalline poly-3-methyl-1-butene was oxidized as a dry powder at 160° C. for 10 hr. to give an acid number of 15.1; crystalline poly-4-methyl-1-pentene was oxidized at 150° C. for 9 hr. to give an acid number of 12.1; crystalline poly-3-methyl-1-hexene was oxidized at 140° C. for 12 hr. to give an acid number of 11.5.

*Example 3*

Another 100-g. aliquot of powdered polypropylene prepared as described in Example 2 was heated in a circulating air oven at 119° C. Samples were taken periodically and the acid number determined on the sample. The results of this oxidation are tabulated below.

Time in hours: Acid number
2 _____ 0.8
3 _____ 1.4
4 _____ 3.4
5 _____ 4.8
6 _____ 6.1
7 _____ 7.9
8 _____ 9.8
24 _____ 22.1

Samples taken after 6 hr., acid number 6.1 or above were found to be emulsified readily by the procedure given in Example 2.

*Example 4*

Another 100-g. aliquot of powdered polypropylene prepared as described in Example 2 was heated in a circulating air oven at 90° C. Samples were taken periodically and the acid number determined on the sample. The results of this oxidation are tabulated below.

Time in hours: Acid number
2 _____ 0
3 _____ 0
5 _____ 0
7 _____ 0
70.5 _____ 15

These results show that at 90° C. the oxidation is very slow but on long exposure the acid number does build up to a satisfactory value.

*Example 5*

Another 100-g. aliquot of powdered polypropylene prepared as described in Example 2 was heated in a circulating air oven at 145° C. Samples were taken periodically and the acid number determined on the sample. The results of this oxidation are tabulated below.

Time in hours: Acid number
1 _____ 7.7
2 _____ 13.7

The acid number build-up was extremely rapid and some sintering of the powder was observed.

*Example 6*

Polypropylene (300 g., I.V. 0.6) was powdered by the procedure described in Example 2. This polypropylene powder was then divided into 3 equal portions and oxidized at 110° C., 120° C., and 130° C. for 15½ hr. The acid number obtained at these different temperatures are given below.

Time in hours: Acid number
110 _____ 11.3
120 _____ 18.6
130 _____ 36.0

*Example 7*

Polypropylene (50 g., I.V. 2.98) powder as obtained from the polymerization reactor was oxidized with air in the powder form in the same manner as described in Example 2 for 15 hr. The acid number obtained was 19.8 and the product had a penetration hardness of 0.5 mm. with a 200 g. weight on the penetrometer needle. The sample was emulsified by the general procedure given above for emulsification. In like manner polypropylene powder obtained directly from the polymerization reactor having an I.V. as high as 4.0 was oxidized by this same powder procedure at 130° C. to give an acid number of 17.0 within 15 hr. These oxidized high molecular weight or high viscosity polypropylenes were emulsifiable by the general procedure given under Example 2. These high viscosity polymers were not oxidizable by the melt or solution technique known to the art. Thus our new method of oxidation is much more versatile than the conventional oxidation procedure. Samples of oxidized polypropylene of high molecular weight were pressed into thin films and subjected to various dye baths and found to take up dyes much better than non-oxidized specimens.

*Example 8*

Polypropylene powder (I.V. 0.3) was oxidized by exposing the powder to the rays of a heat lamp on open bench top for 15 hr. The acid number obtained was 6.9. In like manner an ultraviolet lamp was used to irradiate the powdered polypropylene for 15 hr. to yield an acid number of 8.6.

*Example 9*

Polypropylene (250 g., I.V. 0.3) was melted in a 500 cc. three-necked flask equipped with fritted glass bubbler and a mechanical stirrer. The wax was held within the 165-185° C. range and pure oxygen bubbled into the melt at a rate of 340 cc. per minute. The results of the oxidation experiment are tabulated below.

Time in hours: Acid number
2 _____ 0.17
4 _____ 1.77
6 _____ 3.80
8 _____ 4.38

By comparison of the above results with oxidation results obtained with the powdered polypropylene (same polypropylene, I.V. 0.3) technique of Examples 2, 3 and 5 it is readily noted that the acid number build-up is from 2 to 80 times faster (depending upon the temperature used in powder technique) than that obtained by oxidizing the melt with pure oxygen. When air is used in the melt procedure, the oxidation is even much slower as shown by the oxidation data below for the same polypropylene at 165-185° C. with air bubbling into melt at 340 cc. per minute.

Time in hours: Acid number
2 _____ 0.56
4 _____ 0.63
6 _____ 0.89
8 _____ 1.51

*Example 10*

Polypropylene (45 g. I.V. 0.3) was dissolved in 150 cc. of hot tetrachloroethylene (100-110° C.) and stirred vigorously (800-900 r.p.m.) while pure oxygen was bubbled into the solution at the rate of 340 cc. per minute. Samples were taken periodically and the solid isolated from the solution by pouring the hot solution into an excess of cold ethyl alcohol with stirring. The acid number was determined and the results are tabulated below.

Time in hours: acid number
1¼ _____ 0.87
2¼ _____ 1.51
3 _____ 3.94
4 _____ 7.00
5 _____ 9.10

The above data shows that the above oxidation rate with pure oxygen is comparable to that obtained by the powder technique with air at 130° C. (see Example 2) while faster than that obtained in Examples 3 and 4 and much slower than that obtained by the powder technique illustrated by Example 5.

When air was used in the place of oxygen in the above experiment, the oxidation rate was much slower as shown by the oxidation data shown below.

Time in hours: Acid number
2 _____ 0.16
4 _____ 1.17
6 _____ 2.32
8 _____ 3.3

The oxidation data as shown above illustrating the best technique for oxidation of a solution of polypropylene is definitely an inferior procedure when compared with our method of oxidizing the powdered polypropylene since we can use ordinary air to get fast rates of oxidation. Furthermore, we do not have to isolate the oxidized sample from a solvent.

Thus, by means of this invention, polymers of α-olefins containing 3 to 7 carbon atoms can be oxidized while avoiding the necessity of employing a polymer melt or solution with their attendant disadvantages. The oxidized polymers obtained in accordance with the invention can be molded or extruded into plates or films having increased dyeability and printability. These polymers can also be injection molded by the usual techniques into a great variety of articles. The polymers can also be compounded in the usual manner with pigments, dyes, fillers, stabilizers and the like or blended with other polymeric materials as are well known in the art. In addition, high-melting emulsifiable synthetic waxes which are very useful in wax formulations, protective coatings, and the like, either alone or in blends with other synthetic or naturally occurring waxes, are readily prepared by a very convenient, commercially feasible process.

Although the invention has been described in considerable detail with reference to certain preferred embodiments thereof, it will be understood that variations and modifications can be effected without departing from the spirit and scope of the invention as described hereinabove and as defined in the appended claims.

We claim:

1. The method which comprises oxidizing a crystalline polymer of an aliphatic α-monoolefin containing 3 to 7 carbon atoms by contacting said polymer, in powder form, with a gaseous oxidizing agent at a temperature within the range of about 90° to about 180° C. until the acid number of the resulting product is in the range of about 2 to about 22.

2. The method which comprises oxidizing a crystalline polymer of an aliphatic α-monoolefin containing 3 to 7 carbon atoms by contacting said polymer, in powder form, with oxygen at a temperature within the range of about 90° to about 180° C. until the acid number of the resulting product is in the range of about 2 to about 22.

3. The method which comprises oxidizing a crystalline polymer of an aliphatic α-monoolefin containing 3 to 7 carbon atoms by contacting said polymer, in powder form, with air at a temperature within the range of about 90° to about 180° C. until the acid number of the resulting product is in the range of about 2 to about 22.

4. The method which comprises oxidizing crystalline polypropylene, in powder form, with oxygen at a temperature within the range of about 90° to about 180° C. until the acid number of the resutling product is in the range of about 2 to about 22.

5. The method which comprises oxidizing crystalline polypropylene, in powder form, with air at a temperature within the range of about 90° to about 180° C. until the acid number of the resulting product is in the range of about 2 to about 22.

6. The method which comprises oxidizing crystalline polypropylene, in powder form, with a gaseous oxidizing agent at a temperature within the range of about 90° to about 145° C. until the acid number of the resulting product is in the range of about 2 to about 22.

7. The method which comprises oxidizing crystalline polypropylene, in powder form, with a gaseous oxidizing agent at a temperature within the range of about 100° to about 135° C. until the acid number of the resulting product is in the range of about 2 to about 22.

8. The method which comprises oxidizing a crystalline polymer of an aliphatic α-monoolefin containing 4 to 7 carbon atoms by contacting said polymer, in powder form, with a gaseous oxidizing agent at a temperature within the range of about 90° to about 180° C.

9. The method which comprises oxidizing a crystalline polymer of an aliphatic α-monoolefin containing 4 to 7 carbon atoms by contacting said polymer, in powder form, with a gaseous oxidizing agent at a temperature within the range of about 130° to about 160° C.

References Cited by the Examiner

UNITED STATES PATENTS

| 2,828,296 | 3/1958 | Guillet | 260—937 |
| 2,912,420 | 11/1959 | Thomas | 260—93.7 |
| 2,913,449 | 11/1959 | Hoerger et al. | 260—94.9 |
| 2,918,461 | 12/1959 | Flynn | 260—93.7 |
| 2,957,849 | 10/1960 | Kennedy | 260—937 |
| 3,020,174 | 2/1962 | Natta et al. | 260—93.7 |

FOREIGN PATENTS 800,447  8/1958  Great Britain.

OTHER REFERENCES

Hawkins et al., "Journal of Polymer Science," pages 1–11, December 1959.

JOSEPH L. SCHOFER, *Primary Examiner.*

LESLIE H. GASTON, *Examiner.*